US010611912B2

(12) United States Patent
Inagaki et al.

(10) Patent No.: US 10,611,912 B2
(45) Date of Patent: Apr. 7, 2020

(54) RESIN COMPOSITION AND SHAPED PRODUCT

(71) Applicant: ASAHI KASEI KABUSHIKI KAISHA, Tokyo (JP)

(72) Inventors: Nozomi Inagaki, Tokyo (JP); Mihoko Yamamoto, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/514,236

(22) Filed: Jul. 17, 2019

(65) Prior Publication Data

US 2019/0338120 A1 Nov. 7, 2019

Related U.S. Application Data

(63) Continuation of application No. 15/576,519, filed as application No. PCT/JP2016/002962 on Jun. 20, 2016.

(30) Foreign Application Priority Data

Jul. 22, 2015 (JP) .................................. 2015-145182

(51) Int. Cl.

| C08L 71/12 | (2006.01) |
| C08L 53/02 | (2006.01) |
| C08L 23/12 | (2006.01) |
| C09K 21/12 | (2006.01) |
| C08K 5/521 | (2006.01) |
| C08K 5/5313 | (2006.01) |

(52) U.S. Cl.
CPC ............ *C08L 71/123* (2013.01); *C08K 5/521* (2013.01); *C08K 5/5313* (2013.01); *C08L 23/12* (2013.01); *C08L 53/02* (2013.01); *C09K 21/12* (2013.01); *C08L 2201/02* (2013.01); *C08L 2205/03* (2013.01)

(58) Field of Classification Search
CPC .... C08L 71/123; C08L 53/02; C08L 2205/03; C08L 23/12; C08L 2201/02; C09K 21/12; C08K 5/2313; C08K 5/521
See application file for complete search history.

(56) References Cited

U.S. PATENT DOCUMENTS

| 2004/0014850 A1 | 1/2004 | Jung et al. |
| 2009/0084577 A1 | 4/2009 | Qiu et al. |
| 2009/0088501 A1 | 4/2009 | Qiu et al. |
| 2009/0088502 A1 | 4/2009 | Qiu et al. |
| 2010/0022690 A1* | 1/2010 | Araki ........................ C08J 3/226 524/100 |
| 2011/0266024 A1 | 11/2011 | Qiu et al. |
| 2014/0110149 A1 | 4/2014 | Suzuki |
| 2016/0107362 A1* | 4/2016 | Gubenko .................. B28B 3/26 264/167 |

FOREIGN PATENT DOCUMENTS

| JP | 2003-535180 | 11/2003 |
| JP | 2010-180325 | 8/2010 |
| JP | 2010-540716 | 12/2010 |
| JP | 2011-255652 | 12/2011 |
| JP | 2013/014691 | 1/2013 |
| JP | 2013-234288 | 11/2013 |
| JP | 2014-159513 | 9/2014 |
| JP | 2014-210839 | 11/2014 |
| SG | 183785 | 11/2012 |
| WO | 01/92410 | 6/2001 |
| WO | 2009/042369 | 4/2009 |
| WO | 2011/129129 | 10/2011 |

OTHER PUBLICATIONS

Supplementary European Search Report issued in European Application No. 16827401.7, dated Jun. 7, 2018.
Official Communication issued in International Bureau of WIPO on Patent Application No. PCT/JP2016/002962, dated Jan. 23, 2018.
International Search Report from Application No. PCT/JP2016/002962, dated Aug. 9, 2016.

* cited by examiner

*Primary Examiner* — Robert D Harlan
(74) *Attorney, Agent, or Firm* — Greenblum & Bernstein, P.L.C.

(57) ABSTRACT

Provided are a resin composition and a shaped product having excellent smoke generation properties and chemical resistance. The resin composition and the shaped product contain: a polyphenylene ether resin (I); a polypropylene resin (II); a hydrogenated block copolymer (III) that is a hydrogenated product of a block copolymer including a polymer block A and a polymer block B in which the total amount of vinyl bonding is 30-90%; and a phosphate ester compound (IV). Relative to 100 parts by mass, in total, of components (I) and (II), component (I) is 40-99 parts by mass, component (II) is 1-60 parts by mass, component (III) is 1-20 parts by mass, and component (IV) is 5-45 parts by mass. A partition ratio of component (IV) present in a fraction that dissolves in chloroform and component (IV) present in a fraction that dissolves in o-dichlorobenzene is 10 or more.

6 Claims, 2 Drawing Sheets

FIG. 1A

[Production Method 1]

| | First feeding inlet | | | | Vacuum vent | | Second feeding inlet | Liquid addition pump | | | Vacuum vent | |
|---|---|---|---|---|---|---|---|---|---|---|---|---|
| | C1 | C2 | C3 | C4 | C5 | C6 | C7 | C8 | C9 | C10 | C11 | C12 |
| Screw configuration | | | R1R2NNR3R3B | | L | | | R2NLR3 | | R3R3NLR3 | | |
| Set temperature | 320°C | | | | | | | | 270°C | | | |

L1/L = 0.54

[Production Method 2]

| | First feeding inlet | | | | Vacuum vent | | Second feeding inlet | Liquid addition pump | | | Vacuum vent | |
|---|---|---|---|---|---|---|---|---|---|---|---|---|
| | C1 | C2 | C3 | C4 | C5 | C6 | C7 | C8 | C9 | C10 | C11 | C12 |
| Screw configuration | | | R1R2NNR3R3B | | L | | | R2NLR3 | | R3R3NLR3 | | |
| Set temperature | 270°C | | | | | | | | | | | |

L1/L = 0.54

[Production Method 3]

| | First feeding inlet | | | | Vacuum vent | | Second feeding inlet | Liquid addition pump | | | Vacuum vent | |
|---|---|---|---|---|---|---|---|---|---|---|---|---|
| | C1 | C2 | C3 | C4 | C5 | C6 | C7 | C8 | C9 | C10 | C11 | C12 |
| Screw configuration | | | R1R2NNR3R3B | | L | | | R2NLR3 | | R3R3NLR3 | | |
| Set temperature | 270°C | | | | | | | | | | | |

L1/L = 0.54

[Production Method 4]

| | First feeding inlet | | | | Vacuum vent | | Second feeding inlet | | | | Vacuum vent | Liquid addition pump |
|---|---|---|---|---|---|---|---|---|---|---|---|---|
| | C1 | C2 | C3 | C4 | C5 | C6 | C7 | C8 | C9 | C10 | C11 | C12 |
| Screw configuration | | | R1R2NNR3R3B | | L | | | R2NLR3 | | R3R3NLR3 | | |
| Set temperature | 320°C | | | | | | | | 270°C | | | |

[Production Method 5]

| | First feeding inlet | | | | Vacuum vent | Second feeding inlet | | | Liquid addition pump | Vacuum vent | |
|---|---|---|---|---|---|---|---|---|---|---|---|
| | C1 | C2 | C3 | C4 | C5 | C6 | C7 | C8 | C9 | C10 | C11 | C12 |
| Screw configuration | | | R1R2NkR3R3B | | L | | | R2NLR3 | | R3R3NLR3 | | |
| Set temperature | 320°C | | | | | | | | | | | |
| | L1/L = 0.79 | | | | | | | | | | | |

[Production Method 6]

| | First feeding inlet | | | | Vacuum vent | Second feeding inlet | Liquid addition pump | | | | Vacuum vent | |
|---|---|---|---|---|---|---|---|---|---|---|---|
| | C1 | C2 | C3 | C4 | C5 | C6 | C7 | C8 | C9 | C10 | C11 | C12 |
| Screw configuration | | | R2R2R2 | | L | | | R2R2R3R3 | | R3R3NLR3 | | |
| Set temperature | 320°C | | | | | | | | | | | |
| | L1/L = 0.54 | | | | | | | | | | | |

[Production Method 7]

| | First feeding inlet | | | | Vacuum vent | Second feeding inlet | Liquid addition pump | | | | Vacuum vent | |
|---|---|---|---|---|---|---|---|---|---|---|---|
| | C1 | C2 | C3 | C4 | C5 | C6 | C7 | C8 | C9 | C10 | C11 | C12 |
| Screw configuration | | | R1R2NkR3R3B | | L | | | | R2R2R2 | | | |
| Set temperature | 320°C | | | | | | | 270°C | | | | |
| | L1/L = 0.54 | | | | | | | | | | | |

RESIN COMPOSITION AND SHAPED PRODUCT

CROSS-REFERENCE TO RELATED APPLICATIONS

This application is a Continuation of U.S. patent application Ser. No. 15/576,519, filed Nov. 22, 2017, which is the National Stage of International Patent Application No. PCT/JP2016/002962, filed Jun. 20, 2016, which claims priority of Japanese Patent Application No. 2015-145182, filed on Jul. 22, 2015. The entire disclosure of each of the above-identified applications, including the specification, drawings, and claims, is incorporated herein by reference in its entirety.

TECHNICAL FIELD

This disclosure relates to a resin composition and a shaped product.

BACKGROUND

Although polypropylene has excellent shaping processability, water resistance, oil resistance, acid resistance, alkali resistance, and so forth, it is also known to have poor heat resistance and rigidity. Accordingly, a known technique of compounding polyphenylene ether with polypropylene may be adopted to obtain a resin composition having enhanced properties in terms of heat resistance, rigidity, and so forth.

Examples of techniques for further imparting flame retardance on this resin composition include a commonly adopted technique of adding a halogen-containing compound and antimony trioxide. However, since flame retardants such as halogen-containing compounds and antimony trioxide are undesirable from a viewpoint of environmental health, there is demand for improved flame retardance imparting techniques, such as techniques using flame retardants that do not contain halogen-containing compounds, antimony trioxide, or the like.

Examples of known techniques for responding to this demand include a technique of compounding a flame retardant such as a metal salt of phosphinic acid with a polyphenylene ether resin and a polypropylene resin (for example, refer to PTL 1 to 3). Moreover, PTL 4 and 5 disclose the use of another flame retardant or flame retardant synergist in addition to a metal salt of phosphinic acid to obtain a resin composition having even better flame retardance.

CITATION LIST

Patent Literature

PTL 1: JP 2010-540716 A
PTL 2: WO 2011/129129 A1
PTL 3: JP 2013-14691 A
PTL 4: JP 2014-159513 A
PTL 5: JP 2014-210839 A

SUMMARY

Technical Problem

However, although flame retardance can be obtained in the resin compositions described in the aforementioned patent literature, the chemical resistance that is characteristic of a resin composition containing a polyphenylene ether resin and a polypropylene resin may be lost. In particular, it has been reported that in a case in which a liquid organophosphate is also used in such a resin composition as described in PTL 4 and 5, stability of morphology of the resin composition is lost, resistance to machine oil and mold cleaning agents is reduced, and the resin composition may be affected by such chemicals during shaping processing, leading to cracking. Moreover, these resin compositions suffer from a problem that, in a case in which the content of the polyphenylene ether resin is increased in order to increase flame retardance and shaping fluidity, the density of smoke generated during burning increases and smoke generation properties are negatively affected.

Accordingly, an objective of this disclosure is to provide a resin composition and a shaped product having excellent smoke generation properties and chemical resistance.

Solution to Problem

As a result of diligent investigation conducted to solve the problems set forth above, the inventors discovered that these problems can be beneficially solved through a resin composition and a shaped product that contain a polyphenylene ether resin, a polypropylene resin, a hydrogenated block copolymer having a specific structure, and a phosphate ester compound as a flame retardant in specific proportions, and particularly in which a partition ratio of phosphate ester compound present in a fraction that dissolves in chloroform and phosphate ester compound present in a fraction that dissolves in o-dichlorobenzene is within a specific range. The inventors completed the present disclosure based on these discoveries.

Specifically, this disclose provides the following.

[1] A resin composition comprising:
a polyphenylene ether resin (I);
a polypropylene resin (II);
a hydrogenated block copolymer (III) that is an at least partially hydrogenated product of a block copolymer including a polymer block A of mainly a vinyl aromatic compound and a polymer block B of mainly a conjugated diene compound in which a total amount of 1,2-vinyl bonding and 3,4-vinyl bonding is 30% to 90%; and
a phosphate ester compound (IV), wherein
relative to 100 parts by mass, in total, of the polyphenylene ether resin (I) and the polypropylene resin (II):
the polyphenylene ether resin (I) is contained in an amount of 40 parts by mass to 99 parts by mass;
the polypropylene resin (II) is contained in an amount of 1 part by mass to 60 parts by mass;
the hydrogenated block copolymer (III) is contained in an amount of 1 part by mass to 20 parts by mass; and
the phosphate ester compound (IV) is contained in an amount of 5 parts by mass to 45 parts by mass, and
upon dissolution of the resin composition in chloroform, a ratio $(IV)_{(I)}/(IV)_{(II)}$ is 10 or more, where $(IV)_{(I)}$ represents content of the phosphate ester compound (IV) present in a fraction that dissolves in chloroform and $(IV)_{(II)}$ represents content of the phosphate ester compound (IV) present in a fraction that dissolves in o-dichlorobenzene.

[2] The resin composition according to the foregoing [1], wherein the ratio $(IV)_{(I)}/(IV)_{(II)}$ is 250 or less.

[3] The resin composition according to the foregoing [1], wherein the ratio $(IV)_{(I)}/(IV)_{(II)}$ is 199 or less.

[4] The resin composition according to any one of the foregoing [1] to [3], wherein
the ratio $(IV)_{(I)}/(IV)_{(II)}$ is 15 to 199.

[5] The resin composition according to any one of the foregoing [1] to [4], further comprising 3 parts by mass to 15 parts by mass of at least one phosphinate salt (V) selected from the group consisting of:

a phosphinate salt represented by formula (1)

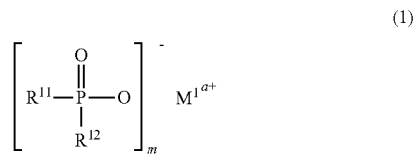

(1)

where $R^{11}$ and $R^{12}$ are each, independently of one another, a linear or branched alkyl group having a carbon number of 1 to 6 and/or an aryl group having a carbon number of 6 to 10, $M^1$ is at least one selected from the group consisting of a calcium ion, a magnesium ion, an aluminum ion, a zinc ion, a bismuth ion, a manganese ion, a sodium ion, a potassium ion, and a protonated nitrogenous base, a is an integer of 1 to 3, m is an integer of 1 to 3, and a=m; and a diphosphinate salt represented by formula (2)

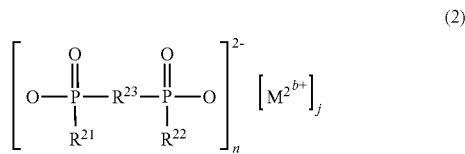

(2)

where $R^{21}$ and $R^{22}$ are each, independently of one another, a linear or branched alkyl group having a carbon number of 1 to 6 and/or an aryl group having a carbon number of 6 to 10, $R^{23}$ is a linear or branched alkylene group having a carbon number of 1 to 10, an arylene group having a carbon number of 6 to 10, an alkylarylene group having a carbon number of 6 to 10, or an arylalkylene group having a carbon number of 6 to 10, $M^2$ is at least one selected from the group consisting of a calcium ion, a magnesium ion, an aluminum ion, a zinc ion, a bismuth ion, a manganese ion, a sodium ion, a potassium ion, and a protonated nitrogenous base, b is an integer of 1 to 3, n is an integer of 1 to 3, j is an integer of 1 or 2, and b·j=2n.

[6] The resin composition according to any one of the foregoing [1] to [5], wherein the total amount of 1,2-vinyl bonding and 3,4-vinyl bonding in the conjugated diene compound of the polymer block B is 65% to 90%, and the conjugated diene compound of the polymer block B includes butadiene.

[7] The resin composition according to any one of the foregoing [1] to [6], wherein the phosphate ester compound (IV) includes a condensed phosphate ester.

[8] The resin composition according to any one of the foregoing [1] to [7], wherein the resin composition has a morphology in which a phase containing the polyphenylene ether resin (I) and a phase containing the polypropylene resin (II) are co-continuous or a morphology in which a phase containing the polypropylene resin (II) is a matrix.

[9] A shaped product comprising the resin composition according to any one of the foregoing [1] to [8].

Advantageous Effect

According to this disclosure, it is possible to provide a resin composition and a shaped product having excellent smoke generation properties and chemical resistance.

BRIEF DESCRIPTION OF THE DRAWING

In the accompanying drawing,

FIGS. 1A and 1B provide an overview of Production Methods 1 to 7 used in production of resin compositions in examples and comparative examples of this disclosure.

DETAILED DESCRIPTION

The following provides a detailed description of an embodiment of this disclosure (hereinafter, referred to as the "present embodiment"). However, this disclosure is not limited to the following embodiment and may be implemented with various alterations that are within the essential scope thereof.

(Resin Composition)

A resin composition of the present embodiment contains a polyphenylene ether resin (I), a polypropylene resin (II), hydrogenated block copolymer (III), and a phosphate ester compound (IV), and may optionally contain a phosphinate salt (V), a thermoplastic resin (VI) other than components (I) and (II), and an additive (VII) other than components (I) to (VI).

The following describes the components in the resin composition of the present embodiment.

The resin composition of the present embodiment has excellent smoke generation properties with the density of smoke generated during burning being low, and has excellent chemical resistance with the tensile strength retention rate after chemical immersion being high.

Moreover, a preferred resin composition of the present embodiment has excellent flame retardance. In the present embodiment, excellent flame retardance is defined as a flame retardance level of V-1 or higher in a UL94 vertical burning test.

—Polyphenylene Ether Resin (I)—

The polyphenylene ether resin (I) used in the present embodiment may be, but is not specifically limited to, a polyphenylene ether, a modified polyphenylene ether, or a mixture of both. Component (I) may be one type used individually, or two or more types used in combination.

From a viewpoint of further improving flame retardance of the resin composition, the reduced viscosity of component (I) is preferably 0.25 dL/g or more, and more preferably 0.28 dL/g or more, and is preferably 0.45 dL/g or less, more preferably 0.36 dL/g or less, and particularly preferably 0.35 dL/g or less. The reduced viscosity can be controlled through the polymerization time and the amount of catalyst.

The reduced viscosity can be measured as ηsp/c of a 0.5 g/dL chloroform solution at a temperature of 30° C. Specifically, the reduced viscosity can be measured by a method described in the subsequent EXAMPLES section.

—Polyphenylene Ether—

The polyphenylene ether may be, but is not specifically limited to, a homopolymer formed from a repeating unit structure represented by the following formula (3) or a copolymer including a repeating unit structure represented by the following formula (3).

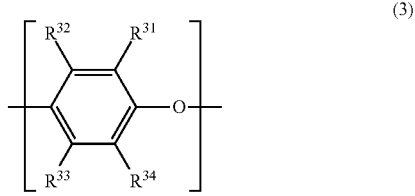

(3)

[In formula (3), $R^{31}$, $R^{32}$, $R^{33}$, and $R^{34}$ are each, independently of one another, a monovalent group selected from the group consisting of a hydrogen atom, a halogen atom, a primary alkyl group having a carbon number of 1 to 7, a secondary alkyl group having a carbon number of 1 to 7, a phenyl group, a haloalkyl group, an aminoalkyl group, an oxyhydrocarbon group, and an oxyhalohydrocarbon group in which a halogen atom and an oxygen atom are separated by at least two carbon atoms.]

Commonly known examples can be used as the polyphenylene ether without any specific limitations. Specific examples of polyphenylene ethers that can be used include homopolymers such as poly(2,6-dimethyl-1,4-phenylene ether), poly(2-methyl-6-ethyl-1,4-phenylene ether), poly(2-methyl-6-phenyl-1,4-phenylene ether), and poly(2,6-dichloro-1,4-phenylene ether); and copolymers such as copolymerized products of 2,6-dimethylphenol with another phenol such as 2,3,6-trimethylphenol or 2-methyl-6-butylphenol. Poly(2,6-dimethyl-1,4-phenylene ether) and a copolymer of 2,6-dimethylphenol and 2,3,6-trimethylphenol are preferable, and poly(2,6-dimethyl-1,4-phenylene ether) is more preferable.

The method by which the polyphenylene ether is produced is not specifically limited and may be a conventional and commonly known method. Specific examples of polyphenylene ether production methods that can be used include a method described in U.S. Pat. No. 3,306,874 A in which a polyphenylene ether is produced through oxidative polymerization of 2,6-xylenol, for example, using a complex of a cuprous salt and an amine as a catalyst, and methods described in U.S. Pat. Nos. 3,306,875 A, 3,257,357 A, 3,257,358 A, JP S52-17880 B, JP S50-51197 A, and JP S63-152628 A.

—Modified Polyphenylene Ether—

The modified polyphenylene ether may be, but is not specifically limited to, a modified polyphenylene ether obtained through grafting or addition of a styrene polymer or derivative thereof to the polyphenylene ether described above. The percentage mass increase due to grafting or addition is not specifically limited, but relative to 100 mass % of the modified polyphenylene ether, is preferably 0.01 mass % or more, and is preferably 10 mass % or less, more preferably 7 mass % or less, and particularly preferably 5 mass % or less.

The method by which the modified polyphenylene ether is produced is not specifically limited and may, for example, be a method in which the polyphenylene ether described above and a styrene polymer or derivative thereof are caused to react in a molten state, solution state, or slurry state at 80° C. to 350° C. in the presence or absence of a radical precursor.

In a case in which the polyphenylene ether resin (I) used in the present embodiment is a mixture of a polyphenylene ether and a modified polyphenylene ether, the mixing ratio of the polyphenylene ether and the modified polyphenylene ether may be any ratio without any specific limitations.

—Polypropylene Resin (II)—

The polypropylene resin (II) used in the present embodiment may be, but is not specifically limited to, a polypropylene, a modified polypropylene, or a mixture of both. Component (II) may be one type used individually, or two or more types used in combination.

From a viewpoint of inhibiting draw-down during burning and improving the balance of fluidity and mechanical strength of the resin composition, the weight average molecular weight (Mw) of component (II) is preferably 400,000 or more, more preferably 700,000 or more, and particularly preferably 750,000 or more, and is preferably 1,500,000 or less, and more preferably 1,300,000 or less.

The weight average molecular weight (Mw) can be determined by gel permeation chromatography (hereinafter, also referred to as "GPC") according to a conventional and commonly known method. Although no specific limitations are made, the mobile phase in the GPC may, for example, be o-dichlorobenzene and the standard material in the GPC may, for example, be polystyrene. More specifically, the weight average molecular weight (Mw) can be measured by a method described in the subsequent EXAMPLES section.

—Polypropylene—

The polypropylene may be, but is not specifically limited to, a homopolymer or copolymer having propylene as a repeating unit structure. A crystalline propylene homopolymer, a crystalline propylene-ethylene block copolymer, or a mixture of a crystalline propylene homopolymer and a crystalline propylene-ethylene block copolymer is preferable.

The crystalline propylene-ethylene block copolymer may be, but is not specifically limited to, a block copolymer having a crystalline propylene homopolymer portion and a propylene-ethylene random copolymer portion.

From a viewpoint of inhibiting draw-down during burning and improving the balance of fluidity and mechanical strength of the resin composition, the melt flow rate (hereinafter, also referred to as the "MFR") of the polypropylene is preferably 0.1 g/10 min or more, and more preferably 0.3 g/10 min or more, and is preferably 10 g/10 min or less, more preferably 6 g/10 min or less, and particularly preferably 3 g/10 min or less.

The MFR can be measured in accordance with ISO 1133 under conditions of a temperature of 230° C. and a load of 2.16 kg. More specifically, the MFR can be measured by a method described in the subsequent EXAMPLES section.

The method by which the polypropylene is produced is not specifically limited and may be a commonly known method.

Specific examples of polypropylene production methods that can be used include a method in which propylene is polymerized at a temperature of 0° C. to 100° C. and a pressure of 3 atm to 100 atm in the presence of a polymerization catalyst composition containing an alkyl aluminum compound and a titanium trichloride catalyst or a halogenated titanium catalyst or the like supported on a support such as magnesium chloride.

In this method, a chain transfer agent such as hydrogen may be added to adjust the molecular weight of the polymer.

Moreover, besides the polymerization catalyst composition, an electron donor compound may be further contained in the polymerization system in this method as an internal donor component or an external donor component to increase isotacticity of the resultant polypropylene and polymerization activity of the polymerization system. The electron donor compound that is used in not specifically limited and may be a commonly known electron donor compound. Specific examples of electron donor compounds that can be used include ester compounds such as ε-caprolactone, methyl methacrylate, ethyl benzoate, and methyl toluate; phosphite esters such as triphenyl phosphite and tributyl phosphite; phosphoric acid derivatives such as hexamethylphosphoric triamide; alkoxy ester compounds; esters of aromatic monocarboxylic acids; aromatic alkylalkoxysilanes; aliphatic hydrocarbon alkoxysilanes; various ether compounds; various alcohols; and various phenols.

The polymerization process, in the above method may be a batch process or a continuous process. Moreover, the polymerization method may, for example, be solution polymerization or slurry polymerization using a solvent such as butane, pentane, hexane, heptane, or octane, bulk polymerization in the monomer without a solvent, or gas-phase polymerization in a gaseous polymer.

Among polypropylene production methods, the method by which a crystalline propylene-ethylene block copolymer, in particular, is produced may be, but is not specifically limited to, a method including a first step of obtaining a crystalline propylene homopolymer portion and a second step of obtaining a propylene-ethylene copolymer portion bonded to the crystalline propylene homopolymer portion through copolymerization of the crystalline propylene homopolymer portion with ethylene and other α-olefins added as necessary. No specific limitations are placed on other α-olefins that may be used and examples thereof include propylene, 1-butene, and 1-hexene.

—Modified Polypropylene—

The modified polypropylene may be, but is not specifically limited to, a modified polypropylene obtained through grafting or addition of an α,β-unsaturated carboxylic acid or a derivative thereof (for example, an acid anhydride or ester) to the polypropylene described above. The percentage mass increase due to the grafting or addition is not specifically limited, but relative to 100 mass % of the modified polypropylene, is preferably 0.01 mass % or more, and is preferably 10 mass % or less, more preferably 7 mass % or less, and particularly preferably 5 mass % or less.

The method by which the modified polypropylene is produced is not specifically limited and may, for example, be a method in which the polypropylene described above and an α,β-unsaturated carboxylic acid or derivative thereof are caused to react in a molten state, solution state, or to slurry state at 30° C. to 350° C. in the presence or absence of a radical precursor.

In a case in which the polypropylene resin (II) used in the present embodiment is a mixture of a polypropylene and a modified polypropylene, the mixing ratio of the polypropylene and the modified polypropylene may be any ratio without any specific limitations.

—Hydrogenated Block Copolymer (III)—

The hydrogenated block copolymer resin (III) used in the present embodiment may be, but is not specifically limited to, an unmodified hydrogenated block copolymer, a modified hydrogenated block copolymer, or a mixture of both. Component (III) may be one type used individually, or two or more types used in combination.

Component (III) acts as a mixing agent or impact resistance imparting agent for the components (I) and (II).

The hydrogenated block copolymer resin (III) is a product obtained through at least partial hydrogenation of a block copolymer including a polymer block A of mainly a vinyl aromatic compound and a polymer block B of mainly a conjugated diene compound. The total amount of 1,2-vinyl bonding and 3,4-vinyl bonding in the conjugated diene compound of the polymer block B (hereinafter, also referred to as the "total amount of vinyl bonding"; described further below) is 30% to 90%.

The following describes matter relating to the modified and unmodified hydrogenated block copolymers.

—Polymer Block a of Mainly Vinyl Aromatic Compound—

The polymer block A of mainly a vinyl aromatic compound may be, but is not specifically limited to, a homopolymer block of a vinyl aromatic compound or a copolymer block of a vinyl aromatic compound and a conjugated diene compound.

Note that "mainly of a vinyl aromatic compound" in the case of the polymer block A means that the content of a vinyl aromatic compound portion in the polymer block A prior to hydrogenation is more than 50 mass %. This content is preferably 70 mass % or more, and more preferably 80 mass % or more, and may be 100 mass % or less.

Examples of the vinyl aromatic compound forming the polymer block A include, but are not specifically limited to, styrene, α-methylstyrene, vinyltoluene, p-tert-butylstyrene, and diphenylethylene. The vinyl aromatic compound is preferably styrene. One vinyl aromatic compound may be used individually, or two or more vinyl aromatic compounds may be used in combination.

From a viewpoint of improving heat creeping-resistance of the resin composition, the number average molecular weight (Mn) of the polymer block A is preferably 15,000 or more, more preferably 20,000 or more, and particularly preferably 25,000 or more, and is preferably 100,000 or less.

The number average molecular weight (Mn) can be determined by GPC (mobile phase: chloroform; standard material: polystyrene) according to a conventional and commonly known method. More specifically, the number average molecular weight (Mn) can be measured by a method described in the subsequent EXAMPLES section.

—Polymer Block B of Mainly Conjugated Diene Compound—

The polymer block B of mainly a conjugated diene compound may be, but is not specifically limited to, a homopolymer block of a conjugated diene compound or a copolymer block of a conjugated diene compound and a vinyl aromatic compound.

Note that "mainly of a conjugated diene compound" in the case of the polymer block B means that the content of a conjugated diene compound portion of the polymer block B prior to hydrogenation is more than 50 mass %. From a viewpoint of increasing fluidity of the resin composition, this content is preferably 70 mass % or more, and more preferably 80 mass % or more, and may be 100 mass % or less.

Examples of the conjugated diene compound forming the polymer block B include, but are not specifically limited to, butadiene, isoprene, 1,3-pentadiene, and 2,3-dimethyl-1,3-butadiene. The conjugated diene compound is preferably butadiene, isoprene, or a combination thereof, and is more preferably butadiene. One conjugated diene compound may be used individually, or two or more conjugated diene compounds may be used in combination.

From a viewpoint of increasing compatibility of the polymer block B with component (II), the total amount of 1,2-vinyl bonding and 3,4-vinyl bonding in the microstructure (conjugated diene compound bonding mode) of the polymer block B is 30% or more, preferably 45% or more, and more preferably 65% or more, and is 90% or less.

The total amount of 1,2-vinyl bonding and 3,4-vinyl bonding (total amount of vinyl bonding) refers to the total amount of 1,2-vinyl bonding and 3,4-vinyl bonding in the polymer block B prior to hydrogenation as a proportion relative to the total amount of 1,2-vinyl bonding, 3,4-vinyl bonding, and 1,4-conjugated bonding. The total amount of vinyl bonding can be determined through measurement using an infrared spectrophotometer and calculation in accordance with the method described in Analytical Chemistry, Volume 21, No. 8, August 1949.

The method by which the block copolymer including the polymer block A and the polymer block B is synthesized is not specifically limited and may, for example, be a commonly known method such as anionic polymerization.

The block structure of the block copolymer of the modified and unmodified hydrogenated block copolymers is not specifically limited. For example, a structure such as A-B, A-B-A, B-A-B-A, (A-B-)$_4$M, or A-B-A-B-A, where "A" represents polymer block A and "B" represents polymer block B, may be used as component (III). Note that (A-B-)$_4$M is a reaction residue of a polyfunctional coupling agent such as silicon tetrachloride (M=Si) or tin tetrachloride (M=Sn), a residue of an initiator such as a polyfunctional organolithium compound, or the like.

The molecular structure of the block copolymer of the modified and unmodified hydrogenated block copolymers is not specifically limited and may, for example, be a linear structure, a branched structure, a radial structure, or a combination of these structures.

Moreover, the distribution of the vinyl aromatic compound in the molecular chain of the polymer block A included in the block copolymer and the distribution of the conjugated diene compound in the molecular chain of the polymer block B included in the block copolymer are not specifically limited and may, for example, be a random distribution, a tapered distribution (i.e., a distribution in which monomer portions increase or decrease along the molecular chain), a partial block-shaped distribution, or a combination of these distributions.

In a case in which the block copolymer includes a plurality of polymer blocks A or polymer blocks B, these polymer blocks A or polymer blocks B may each have the same structure or may have different structures.

With regards to the overall block copolymer including the polymer block A and the polymer block B, from a viewpoint of improving fluidity, impact resistance, and external appearance of the hydrogenated block copolymer (III) and reducing weld formation, the vinyl aromatic compound content in the block copolymer prior to hydrogenation is preferably 20 mass % or more, and more preferably 30 mass % or more, and is preferably 95 mass % or less, and more preferably 80 mass % or less.

The content of the vinyl aromatic compound can be measured using an ultraviolet spectrophotometer.

The number average molecular weight (Mn) of the block copolymer prior to hydrogenation is preferably 5,000 or more, more preferably 10,000 or more, and particularly preferably 30,000 or more, and is preferably 1,000,000 or less, more preferably 800,000 or less, and particularly preferably 500,000 or less.

The number average molecular weight can be measured by GPC (mobile phase: chloroform; standard material: polystyrene) according to a conventional and commonly known method.

The molecular weight distribution (Mw/Mn) of the block copolymer prior to hydrogenation is preferably 10 or less, more preferably 8 or less, and particularly preferably 5 or less.

The molecular weight distribution (Mw/Mn) can be calculated by determining the weight average molecular weight (Mw) by GPC (mobile phase: chloroform: standard material: polystyrene) according to a conventional and commonly known method, and then dividing the weight average molecular weight (Mw) by the number average molecular weight (Mn).

The method by which the block copolymer is hydrogenated is not specifically limited and may, for example, be a method in which hydrogenation is performed under conditions of a reaction temperature of 0° C. to 200° C. and a hydrogen pressure of 0.1 MPa to 15 MPa using (1) a supported heterogeneous hydrogenation catalyst of a metal such as Ni, Pt, Pd, or Ru supported on carbon, silica, alumina, diatomaceous earth, or the like, (2) a Ziegler-type hydrogenation catalyst in which a transition metal salt such as an organic acid salt or acetylacetonate salt of Ni, Co, Fe, Cr, or the like and a reducing agent such as an organoaluminum reducing agent are used, or (3) a homogeneous hydrogenation catalyst in which a organometallic compound of Ti, Ru, Rh, Zr, or the like, referred to as an organometallic complex, is used.

The hydrogenation rate of the conjugated diene compound portion of the polymer block B in the modified and unmodified hydrogenated block copolymers is not specifically limited, but from a viewpoint of increasing heat resistance of the resin composition, is preferably 50% or more, more preferably 80% or more, and particularly preferably 90% or more relative to the total number of double bonds originating from the conjugated diene compound.

The hydrogenation rate can be measured using a nuclear magnetic resonance (NMR) spectrometer.

The method by which the modified and unmodified hydrogenated block copolymers are produced is not specifically limited and may be a commonly known method. Specific examples of commonly known production methods that can be used include those described in JP S47-11486 A, JP S49-66743 A, JP S50-75651 A, JP S54-126255 A, JP S56-10542 A, JP S56-62847 A, JP S56-100840 A, JP H02-300218 A, GB 1130770 A, U.S. Pat. Nos. 3,281,383 A, 3,639,517 A, GB 1020720 A, U.S. Pat. Nos. 3,333,024 A, and 4,501,857 A.

The following describes matter relating particularly to the modified hydrogenated block copolymer.

(Modified Hydrogenated Block Copolymer)

The modified hydrogenated block copolymer is a product obtained through grafting or addition of an α,β-unsaturated carboxylic acid or a derivative thereof (for example, an acid anhydride or an ester) to the unmodified hydrogenated block copolymer described above.

The percentage mass increase due to the grafting or addition is not specifically limited, but relative to 100 mass % of the unmodified hydrogenated block copolymer, is preferably 0.01 mass % or more, and is preferably 10 mass % or less, more preferably 7 mass % or less, and particularly preferably 5 mass % or less.

The method by which the modified hydrogenated block copolymer is produced is not specifically limited and may, for example, be a method in which the unmodified hydrogenated block copolymer and an α,β-unsaturated carboxylic acid or derivative thereof are caused to react in a molten state, solution state, or slurry state at 80° C. to 350° C. in the presence or absence of a radical precursor.

—Phosphate Ester Compound (IV)—

The phosphate ester compound (IV) that may optionally be used in the present embodiment is not specifically limited and any phosphate ester compound (phosphate ester compound, condensed phosphate ester compound, or the like) that has an effect of improving resin composition flame retardance can be used. Examples include triphenyl phosphate, phenyl bisdodecyl phosphate, phenyl bisneopentyl phosphate, phenyl-bis(3,5,5'-trimethyl-hexyl phosphate), ethyl diphenyl phosphate, 2-ethyl-hexyl di(p-tolyl)phosphate, bis(2-ethylhexyl)-p-tolyl phosphate, tritolyl phosphate, bis(2-ethylhexyl)phenyl phosphate, tri(nonylphenyl) phosphate, di(dodecyl)-p-tolyl phosphate, tricresyl phosphate, dibutylphenyl phosphate, 2-chloro-ethyl diphenyl phosphate, p-tolyl bis(2,5,5'-trimethylhexyl)phosphate, 2-ethylhexyl diphenyl phosphate, bisphenol A bis(diphenyl phosphate), diphenyl-(3-hydroxyphenyl)phosphate, bisphenol A bis(dicresyl phosphate), resorcinol bis(diphenyl phosphate), resorcinol bis(dixylenyl phosphate), 2-naphthyl diphenyl phosphate, 1-napthyl diphenyl phosphate, and di(2-naphthyl)phenyl phosphate.

In particular, it is preferable that the phosphate ester compound (IV) has, as a main component, at least one selected from the group consisting of aromatic condensed phosphate ester compounds represented by the following formula (4)

Note that the condensed phosphate ester compounds represented by formula (4) and formula (5) may each include a plurality of types of molecules, and n is preferably an integer of 1 to 3 for each of the molecules.

In a suitable phosphate ester compound (IV) having at least one selected from the group consisting of condensed phosphate ester compounds represented by formula (4) and formula (5) as a main component, overall, the average value of n is preferably 1 or more. This suitable phosphate ester compound (IV) can normally be acquired as a mixture containing 90% or more of compounds for which n is 1 to 3, and besides the compounds for which n is 1 to 3, also containing polymeric products for which n is 4 or more and other by-products.

—Phosphinate Salt (V)—

The phosphinate salt (V) that is used in the present embodiment may, for example, be at least one selected from the group consisting of:

a phosphinate salt represented by the following formula (1)

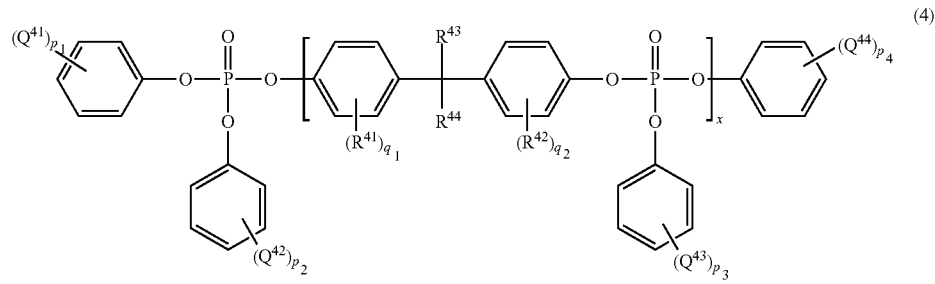

(4)

[in formula (4), $Q^{41}$, $Q^{42}$, $Q^{43}$, and $Q^{44}$ are each, independently of one another, an alkyl group having a carbon number of 1 to 6; $R^{41}$ and $R^{42}$ are each, independently of one another, a methyl group; $R^{43}$ and $R^{44}$ are each, independently of one another, a hydrogen atom or a methyl group; x is an integer of 0 or more; $p_1$, $p_2$, $p_3$, and $p_4$ are each an integer of 0 to 3; and $q_1$ and $q_2$ are each an integer of 0 to 2]

and the following formula (5)

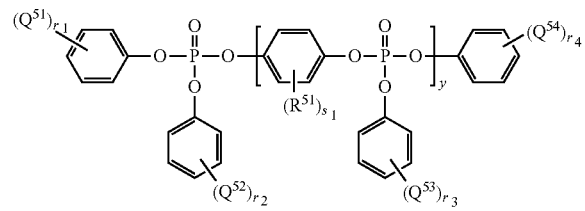

(5)

[in formula (5), $Q^{51}$, $Q^{52}$, $Q^{53}$, and $Q^{54}$ are each, independently of one another, an alkyl group having a carbon number of 1 to 6; $R^{51}$ is a methyl group; y is an integer of 0 or more; $r_1$, $r_2$, $r_3$, and $r_4$ are each an integer of 0 to 3; and si is an integer of 0 to 2].

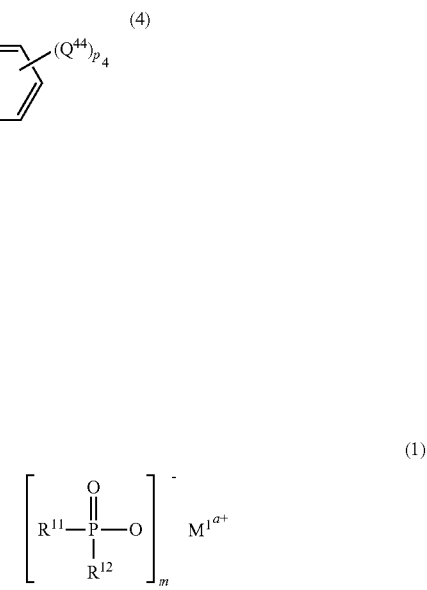

(1)

[in formula (1), $R^{11}$ and $R^{12}$ are each, independently of one another, a linear or branched alkyl group having a carbon number of 1 to 6 and/or an aryl group having a carbon number of 6 to 10; $M^1$ is at least one selected from the group consisting of a calcium ion, a magnesium ion, an aluminum ion, a zinc ion, a bismuth ion, a manganese ion, a sodium ion, a potassium ion, and a protonated nitrogenous base; a is an integer of 1 to 3; m is an integer of 1 to 3; and a=m]; and a diphosphinate salt represented by the following formula (2)

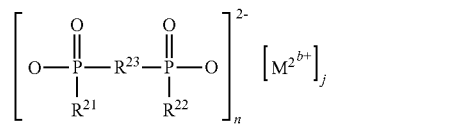

(2)

[in formula (2), $R^{21}$ and $R^{22}$ are each, independently of one another, a linear or branched alkyl group having a carbon number of 1 to 6 and/or an aryl group having a carbon number of 6 to 10; $R^{23}$ is a linear or branched alkylene group having a carbon number of 1 to 10, an arylene group having a carbon number of 6 to 10, an alkylarylene group having a carbon number of 6 to 10, or an arylalkylene group having a carbon number of 6 to 10; $M^2$ is at least one selected from the group consisting of a calcium ion, a magnesium ion, an aluminum ion, a zinc ion, a bismuth ion, a manganese ion, a sodium ion, a potassium ion, and a protonated nitrogenous base; b is an integer of 1 to 3; n is an integer of 1 to 3; j is an integer of 1 or 2; and b·j=2n].

Moreover, the phosphinate salt (V) may be a mixture of a phosphinate salt represented by formula (1) and a diphosphinate salt represented by formula (2).

Examples of such phosphinate salts (V) include, but are not specifically limited to, calcium dimethylphosphinate, magnesium dimethylphosphinate, aluminum dimethylphosphinate, zinc dimethylphosphinate, calcium ethylmethylphosphinate, magnesium ethylmethylphosphinate, aluminum ethylmethylphosphinate, zinc ethylmethylphosphinate, calcium diethylphosphinate, magnesium diethylphosphinate, aluminum diethylphosphinate, zinc diethylphosphinate, calcium methyl-n-propylphosphinate, magnesium methyl-n-propylphosphinate, aluminum methyl-n-propylphosphinate, zinc methyl-n-propylphosphinate, calcium methane di(methylphosphinate), magnesium methane di(methylphosphinate), aluminum methane di(methylphosphinate), zinc methane di(methylphosphinate), calcium benzene-1,4-(dimethylphosphinate), magnesium benzene-1,4-(dimethylphosphinate), aluminum benzene-1,4-(dimethylphosphinate), zinc benzene-1,4-(dimethylphosphinate), calcium methylphenylphosphinate, magnesium methylphenylphosphinate, aluminum methylphenylphosphinate, zinc methylphenylphosphinate, calcium diphenylphosphinate, magnesium diphenylphosphinate, aluminum diphenylphosphinate, and zinc diphenylphosphinate. The phosphinate salt (V) is preferably calcium dimethylphosphinate, aluminum dimethylphosphinate, zinc dimethylphosphinate, calcium ethylmethylphosphinate, aluminum ethylmethylphosphinate, zinc ethylmethylphosphinate, calcium diethylphosphinate, aluminum diethylphosphinate, or zinc diethylphosphinate, and more preferably aluminum diethylphosphinate.

Examples of commercially available products that can be used as the phosphinate salt (V) include, but are not specifically limited to, Exolit® (Exolit is a registered trademark in Japan, other countries, or both) OP1230, OP1240, OP1311, OP1312, OP930, and OP935 produced by Clariant (Japan) K.K.

—Thermoplastic Resin (VI) Other than Components (I) and (II)—

Examples of thermoplastic resins (VI) other than components (I) and (II) that may optionally be used in the present embodiment include, but are not specifically limited to, polystyrene, syndiotactic polystyrene, and high impact polystyrene.

—Additive (VII) Other than Components (I) to (VI)—

Examples of additives (VII) other than components (I) to (VI) that may optionally be used in the present embodiment include, but are not specifically limited to, vinyl aromatic compound-conjugated diene compound block copolymers, olefin elastomers, antioxidants, metal deactivators, heat stabilizers, flame retardants other than components (IV) and (V) (for example, ammonium polyphosphate compounds, magnesium hydroxide, aromatic halogen-containing flame retardants, silicone flame retardants, and zinc borate), fluorine-containing polymers, plasticizers (for example, low molecular weight polyethylene, epoxidized soybean oil, polyethylene glycol, and esters of fatty acids), flame retardant synergists such as antimony trioxide, weather (light) resistance modifiers, nucleating agents for polyolefins, slip agents, organic or inorganic fillers or reinforcers other than component (IV) (for example, carbon black, titanium oxide, calcium carbonate, mica, kaolin, glass fiber, glass flake, and conductive carbon black), various colorants, and mold release agents.

The following describes the proportions of components in the resin composition of the present embodiment.

From a viewpoint of increasing flame retardance, chemical resistance, and shaping fluidity of the resin composition, the content of component (I) in the resin composition of the present embodiment, relative to 100 parts by mass, in total, of components (I) and (II), is 40 parts by mass or more, preferably 50 parts by mass or more, and more preferably 65 parts by mass or more, and is 99 parts by mass or less, preferably 80 parts by mass or less, and more preferably 75 parts by mass or less.

Moreover, from a viewpoint of increasing flame retardance, chemical resistance, and shaping fluidity of the resin composition, the content of component (II) in the resin composition of the present embodiment, relative to 100 parts by mass, in total, of components (I) and (II), is 1 part by mass or more, preferably 20 parts by mass or more, and more preferably 25 parts by mass or more, and is 60 parts by mass or less, preferably 50 parts by mass or less, and more preferably 35 parts by mass or less.

Furthermore, from a viewpoint of increasing flame retardance, chemical resistance, and shaping fluidity of the resin composition, the content of component (III) in the resin composition of the present embodiment, relative to 100 parts by mass, in total, of components (I) and (II), is 1 part by mass or more, preferably 2 parts by mass or more, more preferably 3 parts by mass or more, and particularly preferably 5 parts by mass or more, and from a viewpoint of preventing detachment from a shaped piece, is 20 parts by mass or less, and preferably 15 parts by mass or less.

Also, from a viewpoint of increasing flame retardance, chemical resistance, and shaping fluidity of the resin composition in a good balance, the content of component (IV) in the resin composition of the present embodiment is 5 parts by mass or more, and preferably 10 parts by mass or more, and is 45 parts by mass or less, and preferably 30 parts by mass or less.

Moreover, from a viewpoint of increasing flame retardance of the resin composition, the content of component (V) in the resin composition of the present embodiment is preferably 3 parts by mass or more, and more preferably 4 parts by mass or more, and is preferably 15 parts by mass or less, and more preferably 12 parts by mass or less.

Furthermore, the content of component (VI) in the resin composition of the present embodiment is not specifically limited so long as the effects disclosed herein are not lost and may, for example, be 0 parts by mass to 400 parts by mass.

In the resin composition of the present embodiment, a ratio $(IV)_{(I)}/(IV)_{(II)}$ of content $(IV)_{(I)}$ of the phosphate ester compound (IV) present in a fraction that dissolves in chloroform relative to content $(IV)_{(II)}$ of the phosphate ester compound (IV) present in a fraction that dissolves in o-dichlorobenzene is 10 or more from a viewpoint of improving smoke generation properties and chemical resistance of the resin composition. This ratio $(IV)_{(I)}/(IV)_{(II)}$ is preferably 15 or more, and more preferably 20 or more, and is preferably 250 or less, more preferably 199 or less, even more preferably 99 or less, and particularly preferably 50 or less.

More specifically, $(IV)_{(I)}$ and $(IV)_{(II)}$ can be calculated by the following procedure.

First, the resin composition of the present embodiment is dissolved in chloroform to obtain a chloroform fraction. The polyphenylene ether resin (I), the hydrogenated block copolymer (III), and the like dissolve in the chloroform, but almost none of the polypropylene resin (II) dissolves. Next, a residue fraction that remains without dissolving in the chloroform is dissolved in o-dichlorobenzene to obtain an o-dichlorobenzene fraction. The polypropylene resin (II) and the like that do not dissolve in the chloroform dissolve in the o-dichlorobenzene. Thereafter, methanol is used to perform reprecipitation with respect to the o-dichlorobenzene solution. In this reprecipitation, it is mainly resin components such as the polypropylene resin (II) that reprecipitate and not non-resin components. The content $(IV)_{(I)}$ of the phosphate ester compound (IV) present in the chloroform fraction and the content $(IV)_{(II)}$ of the phosphate ester compound (IV) present in the reprecipitated product are calculated by measuring the absolute mass of the phosphate ester compound (IV) contained in the chloroform fraction and reprecipitated product obtained in this manner (for example, measurement of the concentration of a phosphorus component contained in the chloroform fraction and the reprecipitated product by inductively coupled plasma mass spectrometry (ICP-MS)).

Examples of techniques by which the partition ratio of $(IV)_{(I)}$ and $(IV)_{(II)}$ can be controlled include a technique in which, in production of the resin composition described further below, the polypropylene resin (II) is fed into an extruder in a partitioned manner from a plurality of raw material feeding inlets, a technique in which a temperature profile of a kneading machine in melt-kneading is adjusted, a technique in which the timing of addition of component (IV) is adjusted, and a method in which the positioning of kneading discs in barrel screw configuration is optimized.

(Morphology of Resin Composition)

From a viewpoint of expression of chemical resistance, the morphology in the resin composition of the present embodiment is preferably a morphology in which a polyphenylene ether resin (I) phase and a polypropylene resin (II) phase are co-continuous or a morphology in which a polypropylene resin (II) phase forms a matrix, and is more preferably a morphology in which a polypropylene resin (II) phase forms a matrix. The polyphenylene ether resin (I) phase is a phase that contains the polyphenylene ether resin (I) and may be composed of the polyphenylene ether resin (I). The polypropylene resin (II) phase is a phase that contains the polypropylene resin (II) and may be composed of the polypropylene resin (II).

Methods by which the morphology may be controlled to obtain a morphology such as described above include a method in which the compounding ratio of the polyphenylene ether resin (I), the polypropylene resin (II), and the phosphate ester compound (IV) is adjusted and in which the polypropylene resin (II) is fed into an extruder in a partitioned manner from a plurality of raw material feeding inlets.

Note that the morphology of the resin composition can be observed using a transmission electron microscope (TEM) or the like.

(Production Method of Resin Composition)

The resin composition of the present embodiment can be produced by melt-kneading the components (I) to (IV) set forth above, and also the components (V) to (VII) as necessary.

No specific limitations are placed on the production method of the resin composition of the present embodiment so long as the components (I) to (IV), and also the components (V) to (VII) as necessary, can be melt-kneaded.

One suitable production method for the resin composition of the present embodiment includes a step (1-1) of melt-kneading all of component (I) and all or some of components (II) and (III) to obtain a kneaded product, a step (1-2) of adding the remainder of components (II) and (III) to the kneaded product obtained in step (1-1) (excluding a case in which all of components (II) and (III) are added in step (1-1)) and performing further melt-kneading to obtain a kneaded product, and a step (1-3) of adding all of component (IV) to the kneaded product obtained in step (1-2) and performing further melt-kneading.

A suitable production method for the resin composition of the present embodiment may be a method in which melt-kneading is performed over multiple stages. These multiple stages are not specifically limited other than being two or more stages.

This method in the present embodiment may, for example, include a step in which all of component (I), some of component (II), all of component (III), and all of component (IV) are melt-kneaded in a first stage to obtain pellets, and a step in which the pellets obtained in the first stage, the remainder of component (II), and, as necessary, components (I) to (VII) are added and further melt-kneaded in a second stage. In such a case, all of component (II) may alternatively be added in the second stage.

Moreover, another suitable production method for the resin composition of the present embodiment is a masterbatch method in which a resin composition (masterbatch) containing specific components in a high concentration is prepared in advance, and the masterbatch is subsequently diluted to obtain a resin composition containing each component in a desired concentration.

This method in the present embodiment may, for example, include a step in which all of component (I), some of component (II), all of component (II), and all of component (IV) are melt-kneaded in a first stage to obtain masterbatch pellets containing component (IV) in a higher concentration than in the final composition, and a step in which the masterbatch pellets, the remainder of component (II), and, as necessary, components (V) to (VII) are added and further melt-kneaded in a second stage to obtain the final composition. In this case, all of component (II) may alternatively be added in the second stage.

Examples of melt-kneading machines that can suitably be used to perform melt-kneading of the components in a production method such as set forth above include, but are not specifically limited to, heated melt-kneading machines such as an extruder (for example, a single screw extruder or a multiscrew extruder such as a twin screw extruder), a roller, a kneader, a Brabender Plastograph, and a Banbury mixer. In particular, a twin screw extruder is preferable from a viewpoint of kneading performance. Specific examples of twin screw extruders that can be used include the ZSK series produced by Coperion Inc., the TEM series produced by Toshiba Machine Co., Ltd., and the TEX series produced by The Japan Steel Works, Ltd.

The following describes a preferred embodiment of a case in which an extruder such as a single screw extruder, twin screw extruder, or other multiscrew extruder is used.

The type, specifications, and so forth of the extruder are not specifically limited and may be commonly known examples thereof.

L/D of the extruder (barrel effective length/barrel internal diameter) is preferably 20 or more, and more preferably 30 or more, and is preferably 75 or less, and more preferably 60 or less.

The extruder preferably has a configuration including different raw material feeding inlets at two or more locations, vacuum vents at two or more locations, and liquid addition pumps (described further below) at one or more locations. In terms of positioning of the equipment described above, from a viewpoint of density of generated smoke and expression of chemical resistance, it is more preferable that, in the direction of raw material flow, a first raw material feeding inlet is located at an upstream side, a first vacuum vent is located further downstream than the first raw material feeding inlet, a second raw material feeding inlet is located further downstream than the first vacuum vent, a liquid addition pump is located further downstream than the second raw material feeding inlet, and a second vacuum vent is located further downstream than the liquid addition pump.

The method by which a raw material is fed at the second raw material feeding inlet is not specifically limited and may be a method in which the raw material is simply added from an opening in an upper part of the raw material feeding inlet or a method in which the raw material is added from a side opening using a forced side feeder. In particular, a method in which the raw material is added from a side opening using a forced side feeder is preferable from a viewpoint of stable feeding.

The melt-kneading temperature in melt-kneading of the components may normally be 270° C. to 320° C.

In particular, it is preferable that the temperature between the first raw material feeding inlet and the second raw material feeding inlet is set as at least 300° C. and not higher than 320° C. from a viewpoint of expression of smoke generation properties and chemical resistance of the resin composition.

Moreover, from a viewpoint of expression of smoke generation properties and chemical resistance of the resin composition, it is preferable that the set temperature for between the first raw material feeding inlet and the second raw material feeding inlet and the set temperature for a section further downstream than the second raw material feeding inlet differ from one another. Specifically, it is preferable that the set temperature for between the first raw material feeding inlet and the second raw material feeding inlet is at least 300° C. and not higher than 320° C., and that the set temperature for the section further downstream than the second raw material feeding inlet is at least 270° C. and lower than 300° C.

The configuration of a screw included in a barrel is not specifically limited and may be a configuration in which right-handed, left-handed, orthogonal (N-type), and back-conveying (L-type) kneading disc elements are provided as appropriate. In particular, a configuration in which at least one orthogonal (N-type) kneading disc element and at least one back-conveying (L-type) kneading disc element are provided between the first raw material feeding inlet and the second raw material feeding inlet, and in which at least one orthogonal (N-type) kneading disc element is provided between the liquid addition pump and the vacuum vent located further downstream than the liquid addition pump is preferable since this configuration enables control of the dispersion state of the phosphate ester compound (IV) to within a specific range.

Although no specific limitations are placed on the screw rotation speed, the screw rotation speed may normally be 100 rpm to 1,200 rpm, and is preferably 200 rpm to 700 rpm from a viewpoint of smoke generation properties and expression of chemical resistance.

In a case in which a liquid raw material is to be added, the liquid raw material can be added by using a liquid addition pump or the like in a cylinder section of the extruder to directly feed the liquid raw material into the cylinder. The liquid addition pump may be, but is not specifically limited to, a gear pump, a flange pump, or the like, and is preferably a gear pump. In this case, from a viewpoint of reducing the load on the liquid addition pump and improving raw material operability, it is preferable to lower the viscosity of the liquid raw material by using a heater or the like to heat a tank in which the liquid raw material is stored or a section that forms a flow path of the liquid raw material, such as piping between the tank and the liquid addition pump and piping between the pump and the extruder cylinder.

In terms of the addition position of the phosphate ester compound (IV), a ratio L1/L of the length L1 from the first raw material feeding inlet to the addition position of the phosphate ester compound relative to the total barrel effective length L is preferably 0.2 to 0.75 since this enables control of the dispersion state of the phosphate ester compound (IV) to within a specific range. The value of L1/L is more preferably 0.25 to 0.7, and even more preferably 0.3 to 0.6.

(Shaped Product)

A shaped product of the present embodiment is formed from the resin composition of the present embodiment set forth above.

The shaped product of the resin composition of the present embodiment is not specifically limited and examples thereof include automotive components, interior and exterior components of electrical devices, other components, and so forth. Examples of automotive components include, but are not specifically limited to, exterior components such as bumpers, fenders, door panels, various moldings, emblems, engine hoods, wheel caps, roofs, spoilers, and various aero parts; interior components such as instrument panels, console boxes, and trims; battery case components for secondary batteries installed in vehicles, electric vehicles, hybrid electric vehicles, and the like; and lithium ion secondary battery components. Examples of interior and exterior components of electrical devices include, but are not specifically limited to, components used in various computers and peripheral equipment thereof, other office automation equipment, televisions, video recorders, cabinets for various disc players, chassis, refrigerators, air conditioners, and LCD projectors. Examples of other components include wires and cables obtained by applying a coating on a metal conductor or optical fiber, fuel cases for solid methanol batteries, water pipes for fuel cells, water cooling tanks, boiler exterior cases, ink peripheral components and parts for inkjet printers, furniture (chairs, etc.), chassis, water piping, and joints.

(Production Method of Shaped Product)

The shaped product of the present embodiment can be produced through shaping of the resin composition of the present embodiment set forth above.

The production method of the shaped product of the present embodiment may be, but is not specifically limited to, injection molding, extrusion molding, profile extrusion molding, blow molding, compression molding, or the like, and is preferably injection molding from a viewpoint of more effectively obtaining the effects disclosed herein.

EXAMPLES

The following describes embodiments of this disclosure based on examples, but this disclosure is not limited to these examples.

Raw materials used for resin compositions and shaped products in the examples and comparative examples were as follows.

—Polyphenylene Ether Resin (I)—

(I-i): Polyphenylene ether obtained through oxidative polymerization if of 2,6-xylenol and having a reduced viscosity (ηsp/c: 0.5 g/dL chloroform solution) of 0.33

(I-ii): Polyphenylene ether obtained through oxidative polymerization of 2,6-xylenol and having a reduced viscosity (ηsp/c: 0.5 g/dL chloroform solution) of 0.42

Note that the reduced viscosity was measured as ηsp/c of a 0.5 g/dL chloroform solution at a temperature of 30° C.

—Polypropylene Resin (II)—

(II-i): Polypropylene homopolymer having an MFR of 0.4 g/10 min (II-ii): Polypropylene homopolymer having an MFR of 5.9 g/10 min (II-iii): Polypropylene homopolymer having an MFR of 15 g/10 min Note that the MFR was measured in accordance with ISO 1133 under conditions of a temperature of 230° C. and a load of 2.16 kg.

—Hydrogenated Block Copolymer (III)—

(III): Polymer synthesized as described below

A block copolymer having a B-A-B-A block structure in which the polymer blocks A were formed from polystyrene and the polymer blocks B were formed from polybutadiene was synthesized by a commonly known method. The synthesized block copolymer was hydrogenated by a commonly known method. Polymer modification was not performed. The physical properties of the unmodified hydrogenated block copolymer that was obtained were as follows.

(III-i): B-A-B-A type

Polystyrene content in block copolymer prior to hydrogenation: 44%

Number average molecular weight (Mn) of block copolymer prior to hydrogenation: 95,000

Number average molecular weight (Mn) of polystyrene blocks: 41,800

Number average molecular weight (Mn) of polybutadiene blocks: 53,200

Molecular weight distribution (Mw/Mn) of block copolymer prior to hydrogenation: 1.06

Total amount of vinyl bonding (amount of 1,2-vinyl bonding) in polybutadiene blocks prior to hydrogenation: 75%

Hydrogenation rate of polybutadiene portion of polybutadiene blocks: 99.9%

The vinyl aromatic compound content was measured using an ultraviolet spectrophotometer. The number average molecular weight (Mn) was determined by GPC (mobile phase: chloroform; standard material: polystyrene) according to a conventional and commonly known method. The molecular weight distribution (Mw/Mn) was calculated by determining the weight average molecular weight (Mw) by GPC (mobile phase: chloroform; standard material: polystyrene) according to a conventional and commonly known method, and then dividing the weight average molecular weight (Mw) by the number average molecular weight (Mn). The total amount of vinyl bonding was determined through measurement using an infrared spectrophotometer and calculation in accordance with the method described in Analytical Chemistry, Volume 21, No. 8, August 1949. The hydrogenation rate was measured using a nuclear magnetic resonance (NMR) spectrometer.

—Phosphate Ester Compound (IV)—

(IV): E890 (condensed phosphate ester compound) produced by Daihachi Chemical Industry Co., Ltd.

—Phosphinate Salt (V)—

(V): Exolit OP1230 (corresponding to formula (1)) produced by Clariant (Japan) K.K.

The following raw material was used particularly in resin compositions of the comparative examples.

(III-x): A-B-A type

Polystyrene content in block copolymer prior to hydrogenation: 65%

Number average molecular weight (Mn) of block copolymer prior to hydrogenation: 53,000

Number average molecular weight (Mn) of polystyrene blocks: 34,800

Number average molecular weight (Mn) of polybutadiene blocks: 18,700

Molecular weight distribution (Mw/Mn) of block copolymer prior to hydrogenation: 1.23

Total amount of vinyl bonding (amount of 1,2-vinyl bonding) in polybutadiene blocks prior to hydrogenation: 9%

Hydrogenation rate of polybutadiene portion of polybutadiene blocks: 99.9%

Physical property measurement methods (1) to (4) in the examples and comparative examples were as follows.

(1) Calculation of Ratio $(IV)_{(I)}/(IV)_{(II)}$

A resin composition produced as described below was sampled into a filter paper thimble in an amount of 2 g and Soxhlet extraction was performed for 8 hours at 65° C. to 75° C. using 120 mL of chloroform to separate a residue fraction (A) on the filter paper thimble and a chloroform-soluble fraction (B). The chloroform-soluble fraction (B) was taken to be a fraction of the resin composition that dissolves in chloroform.

With respect to the residue fraction (A) on the filter paper thimble, 50 mL of 150° C. o-dichlorobenzene was added and high-temperature centrifugal separation (150° C., twice for 30 minutes at 12,000 rpm) was performed to separate a residue fraction (C) and an o-dichlorobenzene-soluble fraction (D). The o-dichlorobenzene-soluble fraction (D) was further subjected to reprecipitation through addition of methanol to separate a methanol-insoluble fraction (E) and a methanol-soluble fraction (F). The finally obtained methanol-insoluble fraction (E) was taken to be a fraction of the resin composition that dissolves in o-dichlorobenzene.

The concentration of a phosphorus component extracted in the chloroform-soluble fraction (B) and the methanol-insoluble fraction (E) obtained through this operation was measured by inductively coupled plasma mass spectrometry (ICP-MS). The measured phosphorus component concentration was used to calculate the absolute mass of component (IV) present in the soluble fraction (B) and the absolute mass of component (IV) present in the insoluble fraction (E). These calculated absolute masses were taken to be the content $(IV)_{(I)}$ of component (IV) present in a fraction of the resin composition that dissolves in chloroform and the content $(IV)_{(II)}$ of component (IV) present in a fraction of the resin composition that dissolves in o-dichlorobenzene. Moreover, the ratio $(IV)_{(I)}/(IV)_{(II)}$ of $(IV)_{(I)}$ relative to $(IV)_{(II)}$ was calculated.

Since polyphenylene ether dissolves in chloroform and polypropylene dissolves in o-dichlorobenzene but does not dissolve in chloroform, $(IV)_{(I)}$ indirectly indicates the content of phosphate ester in polyphenylene ether and $(IV)_{(II)}$ indirectly indicates the content of phosphate ester in polypropylene.

(2) Smoke Generation Properties

The generated-smoke density of obtained resin composition pellets was measured in accordance with ASTM D662 (flaming mode), and the amount of smoke generation (Ds) was measured. In terms of evaluation criteria, a lower measured value was judged to indicate better smoke generation properties.

(3) Electrolysis Solution-Resistance

A solution (electrolysis solution) prepared by dissolving lithium hexafluorophosphate in a mixed solution of 1:1:1 ethylene carbonate:propylene carbonate:diethylene carbonate such as to have a concentration of 1 mol/L was used as an immersion test solution.

Obtained resin pellets were fed into a small-size injection molding machine (product name: IS-100GN; produced by Toshiba Machine Co., Ltd.) set to a cylinder temperature of 250° C. and were molded under conditions of a mold temperature of 70° C., an injection pressure of 70 MPa, an injection time of 20 seconds, and a cooling time of 15 seconds to prepare an ISO dumbbell-shaped specimen for evaluation.

The prepared dumbbell-shaped specimen was immersed in the immersion test solution for 300 hours at 60° C. and was subsequently removed from the immersion test solution. The tensile strength of the dumbbell-shaped specimen after immersion was measured in accordance with ISO 527-1. The tensile strength of the dumbbell-shaped specimen after immersion as a proportion relative to the tensile strength of a dumbbell-shaped specimen that had not been treated in the immersion test solution was calculated as a tensile strength retention rate (indicated in % in the subsequently described Tables 1 and 2). In terms of evaluation criteria, a higher measured value was judged to indicate a better tensile strength retention rate and chemical resistance.

(4) Chemical Resistance

Obtained resin pellets were fed into a small-size injection molding machine (product name: TS-100GN; produced by Toshiba Machine Co., Ltd.) set to a cylinder temperature of 270° C. and were molded under conditions of a mold temperature of 70° C., an injection pressure of 75 MPa, an injection time of 20 seconds, and a cooling time of 15 seconds to obtain a flat plate of 150 mm×150 mm×3 mm.

A specimen of 75 mm×12.7 mm×3 mm was cut out from the flat plate and was set in a bending form designed to enable continuous variation of strain of the specimen. Chemicals described below were applied onto the surface of the specimen and were left for 48 hours under conditions of 23° C. and 50% RH. After 48 hours had passed, strain was applied to the specimen and the end position of the bending form at which cracking of the surface of the specimen occurred was measured to determine the critical strain (%), which indicates strain at the limit at which cracking does not occur. In terms of evaluation criteria, a larger value for the critical strain was judged to indicate better chemical resistance.

The chemicals used in this chemical resistance test were as follows.

Salad oil (produced by Nisshin Foods)
Mold cleaning agent (Super 102C produced by Somax Co., Ltd.)
Grease (MOLYCOTE EM-30L produced by Dow Corning Toray)

(5) Flame Retardance

Obtained resin composition pellets were fed into a small-size injection molding machine (product name: IS-100GN; produced by Toshiba Machine Co., Ltd.) set to a cylinder temperature of 240° C. and were molded under conditions of a mold temperature of 70° C. and an injection pressure of 60 MPa to prepare five specimens (thickness 1.6 mm) for UL94 vertical burning test measurement. The flame retardance of these five specimens was evaluated based on the UL94 vertical burning test method. A flame was brought into contact with each specimen for 10 seconds and then removed, and the burning time until a flame on the specimen extinguished after removal was taken to be t1 (s). Thereafter, a flame was brought into contact with the specimen for a further 10 seconds and then removed, and the burning time until a flame on the specimen extinguished after removal was taken to be t2 (s). For each of the five specimens, the average value of t1 and t2 was determined as the average burning time. Moreover, a longest burning time among the 10 measurements of t1 and t2 was determined as the longest burning time. A judgment of V-0, V-1, V-2, or HB was made based on UL94 regulations. In particular, a resin composition was judged to be preferable when the flame retardance level was determined to be V-1 or higher.

(6) Morphology

An ultrathin slice of 80 nm in thickness was prepared from an obtained resin composition pellet using an ultramicrotome, the slice was dyed using ruthenium tetroxide, and the resultant sample was observed at ×10,000 magnification using a TEM (HT7700 produced by Hitachi High-Technologies Corporation).

The following describes the examples and comparative examples in detail.

A twin screw extruder (ZSK-25 produced by Coperion Inc.) was used as a melt-kneading machine for producing resin compositions in the examples and comparative examples. L/D of the extruder was 35.

The twin screw extruder had a configuration including, in a direction of raw material flow, a first raw material feeding inlet located at an upstream side, a second raw material feeding inlet located further downstream than the first raw material feeding inlet, a liquid addition pump located further downstream than the second raw material feeding inlet, and a vacuum vent located between the first raw material feeding inlet and the second raw material feeding inlet. An additional liquid addition pump and vacuum vent were provided further downstream than the first raw material feeding inlet as necessary, and the positions thereof were appropriately changed as necessary.

The extruder used in the examples and comparative examples had 12 barrels and the screw configuration in these barrels was as follows.

R1-R2-N-N-R3-R3-B (third to fourth barrels in subsequently described Production Method 1)

L (fifth barrel in subsequently described Production Method 1)

R2-N-L-R3 (eighth barrel in subsequently described Production Method 1)

R3-R3-N-L-R3 (ninth to eleventh barrels in subsequently described Production Method 1)

Note that the meanings of abbreviations for kneading discs used to denote the screw configuration are as follows.

R1: Kneading disc right (L/D=1.44)
R2: Kneading disc right (L/D=0.96)
R3: Kneading disc right (L/D=0.48)
L: Kneading disc left (L/D=0.48)
N (N-type): Kneading disc neutral (L/D=1.04)
B (L-type): Double flight screw back-conveying (L/D=0.48)

Moreover, resin composition pellets were produced using 7 production methods (Production Methods 1 to 7) illustrated in FIG. 1 by altering the positions of raw material feeding inlets, vacuum vents, and liquid addition pumps, the set temperature of each barrel, and the addition position of component (IV).

Examples 1 to 15 and Comparative Examples 1 to 20

The twin screw extruder set-up as described above was used to melt-knead components (I) to (V) with the composition and production conditions shown in Tables 1 and 2 at a discharge rate of 15 kg/hr to produce resin composition pellets.

In the examples and comparative examples, physical property tests were carried out by the previously described measurement methods (1) to (4). The results are shown in Tables 1 and 2.

TABLE 1-1

| | | | | Example 1 | Example 2 | Example 3 | Example 4 | Example 5 | Example 6 | Example 7 |
|---|---|---|---|---|---|---|---|---|---|---|
| Resin composition | Component (I) | | Parts by mass | 70 | 70 | 70 | 70 | 70 | 70 | 70 |
| | Component (II) | | Parts by mass | 30 | 30 | 30 | 30 | 30 | 30 | 30 |
| | Component (III) | | Parts by mass | 10 | 10 | 10 | 10 | 10 | 10 | 10 |
| | Component (IV) | | Parts by mass | 15 | 15 | 15 | 15 | 15 | 15 | 15 |
| | Component (V) | | Parts by mass | 7 | 7 | 0 | 7 | 7 | 7 | 7 |
| | Total amount of vinyl bonding in polymer block B of component (III) | | % | 75 | 75 | 57 | 75 | 75 | 75 | 75 |
| Production method | | | — | Production Method 1 | Production Method 2 | Production Method 1 | Production Method 1 | Production Method 1 | Production Method 1 | Production Method 2 |
| Resin composition production method | Screw rotation speed | | rpm | 300 | 300 | 300 | 300 | 300 | 300 | 300 |
| | First raw material feeding inlet | Component (I-i) | Parts by mass | 70 | 70 | 70 | 70 | 70 | 0 | 0 |
| | | Component (I-ii) | | 0 | 0 | 0 | 0 | 0 | 70 | 70 |
| | | Component (II-i) | | 10 | 10 | 10 | 10 | 0 | 0 | 0 |
| | | Component (II-ii) | | 0 | 0 | 0 | 10 | 0 | 10 | 10 |
| | | Component (II-iii) | | 0 | 0 | 0 | 0 | 10 | 0 | 0 |
| | | Component (III-i) | | 10 | 10 | 10 | 10 | 10 | 10 | 10 |
| | | Component (III-x) | | 0 | 0 | 0 | 0 | 0 | 0 | 0 |
| | Second raw material feeding inlet | Component (II-i) | Parts by mass | 20 | 20 | 20 | 0 | 0 | 0 | 0 |
| | | Component (II-ii) | | 0 | 0 | 0 | 20 | 0 | 20 | 20 |
| | | Component (II-iii) | | 0 | 0 | 0 | 0 | 20 | 0 | 0 |
| | | Component (V) | | 7 | 7 | 0 | 7 | 7 | 7 | 7 |
| | Liquid addition pump | Component (IV) | Parts by mass | 15 | 15 | 15 | 15 | 15 | 15 | 15 |
| Resin composition physical properties | Partition ratio of component (IV) | $(IV)_{(I)}/(IV)_{(II)}$ | | 99.0 | 130 | 49.0 | 32.3 | 15.7 | 89.5 | 117 |
| | Morphology | (1) Co-continuous component (I) phase and component (II) phase | | Yes | Yes | No | No | No | Yes | Yes |
| | | (2) Component (II) phase forms matrix | | No | No | Yes | Yes | Yes | No | No |

TABLE 1-1-continued

|  |  |  |  |  |  |  |  |  |  |
|---|---|---|---|---|---|---|---|---|---|
|  |  | (3) Neither of (I) and (2) applies |  | No | No | No | No | No | No | No |
| Physical property evaluation results | Smoke generation properties |  | Generated-smoke density Ds | 378 | 389 | 265 | 357 | 351 | 366 | 380 |
|  |  | Electro-lysis solution-resistance | Tensile strength retention rate (%) | 75 | 72 | 85 | 77 | 78 | 76 | 74 |
|  | Chem-ical resist-ance | Salad-oil resistance | Critical strain (%) | 0.70 | 0.69 | 0.76 | 0.72 | 0.72 | 0.73 | 0.68 |
|  |  | Mold cleaning agent-resistance |  | 1.63 | 1.60 | 1.72 | 1.62 | 1.64 | 1.69 | 1.55 |
|  |  | Grease-resistance |  | 1.11 | 1.09 | 1.30 | 1.13 | 1.15 | 1.21 | 1.04 |
|  | Flame retardance |  | Rank | V-0 | V-0 | HB | V-0 | V-0 | V-0 | V-0 |

|  |  |  |  | Example 8 | Example 9 | Example 10 | Example 11 | Example 12 | Example 13 |
|---|---|---|---|---|---|---|---|---|---|
| Resin compo-sition | Component (I) |  | Parts by mass | 70 | 80 | 60 | 45 | 70 | 70 |
|  | Component (II) |  | Parts by mass | 30 | 20 | 40 | 55 | 30 | 30 |
|  | Component (III) |  | Parts by mass | 10 | 10 | 10 | 10 | 10 | 10 |
|  | Component (IV) |  | Parts by mass | 15 | 17 | 14 | 15 | 15 | 15 |
|  | Component (V) |  | Parts by mass | 7 | 7 | 10 | 7 | 7 | 7 |
|  | Total amount of vinyl bonding in polymer block of component (III) |  | % | 75 | 75 | 75 | 75 | 75 | 75 |
| Production method |  |  | — | Production Method 1 | Production Method 1 | Production Method 1 | Production Method 1 | Production Method 2 | Production Method 6 |
| Resin compo-sition production method | Screw rotation speed |  | rpm | 300 | 300 | 300 | 300 | 600 | 300 |
|  | First raw material feeding inlet | Component (I-i) | Parts by mass | 0 | 80 | 60 | 45 | 0 | 0 |
|  |  | Component (I-ii) |  | 70 | 0 | 0 | 0 | 70 | 70 |
|  |  | Component (II-i) |  | 10 | 10 | 10 | 10 | 0 | 0 |
|  |  | Component (II-ii) |  | 0 | 0 | 0 | 0 | 10 | 10 |
|  |  | Component (II-iii) |  | 0 | 0 | 0 | 0 | 0 | 0 |
|  |  | Component (III-i) |  | 10 | 10 | 10 | 10 | 10 | 10 |
|  |  | Component (III-x) |  | 0 | 0 | 0 | 0 | 0 | 0 |
|  | Second raw material feeding inlet | Component (II-i) | Parts by mass | 20 | 10 | 30 | 45 | 0 | 0 |
|  |  | Component (II-ii) |  | 0 | 0 | 0 | 0 | 20 | 20 |
|  |  | Component (II-iii) |  | 0 | 0 | 0 | 0 | 0 | 0 |
|  |  | Component (V) |  | 7 | 6 | 10 | 7 | 7 | — |
|  | Liquid addition pump | Component (IV) | Parts by mass | 15 | 17 | 14 | 15 | 15 | 15 |
| Resin compo-sition physical properties | Partition ratio of compo-nent (IV) | $(IV)_{(I)}/(IV)_{(II)}$ |  | 32.3 | 99.0 | 49.0 | 99.0 | 278 | 235 |
|  | Morph-ology | (1) Co-continuous component (I) phase and component (II) phase |  | No | Yes | No | No | No | Yes |
|  |  | (2) Component (II) phase forms matrix |  | Yes | No | Yes | Yes | No | No |

TABLE 1-1-continued

|  |  |  |  |  |  |  |  |  |
|---|---|---|---|---|---|---|---|---|
| | | (3) Neither of (I) and (2) applies | | No | No | No | No | Yes | No |
| Physical property evaluation results | Smoke generation properties | | Generated-smoke density Ds | 297 | 405 | 311 | 302 | 486 | 470 |
| | Electrolysis solution-resistance | Tensile strength retention rate (%) | | 70 | 65 | 82 | 76 | 58 | 60 |
| | Chemical resistance | Salad-oil resistance | Critical strain (%) | 0.60 | 0.56 | 0.73 | 0.71 | 0.65 | 0.68 |
| | | Mold cleaning agent-resistance | | 1.47 | 1.41 | 1.70 | 1.66 | 1.33 | 1.38 |
| | | Grease-resistance | | 1.01 | 0.96 | 1.29 | 1.15 | 0.94 | 1.00 |
| | Flame retardance | | Rank | V-0 | V-0 | V-0 | V-2 | V-0 | V-1 |

| | | | | Example 14 | | Example 15 | |
|---|---|---|---|---|---|---|---|
| Resin composition | Component (I) | | Parts by mass | 70 | | 70 | |
| | Component (II) | | Parts by mass | 30 | | 30 | |
| | Component (III) | | Parts by mass | 10 | | 10 | |
| | Component (IV) | | Parts by mass | 15 | | 15 | |
| | Component (V) | | Parts by mass | 7 | | 7 | |
| | Total amount of vinyl bonding in polymer block of component (III) | | % | 75 | | 75 | |
| Production method step | | | | First stage | Second stage | First stage | Second stage |
| Production method | | | | Production Method 1 | Production Method 1 | Production Method 1 | Production Method 1 |
| Resin composition production method | First raw material feeding inlet | Component (I-i) | Parts by mass | 70 | 0 | 70 | 0 |
| | | Component (I-ii) | | 0 | 0 | 0 | 0 |
| | | Component (II-i) | | 10 | 20 | 0 | 30 |
| | | Component (II-ii) | | 0 | 0 | 0 | 0 |
| | | Component (II-iii) | | 0 | 0 | 0 | 0 |
| | | Component (III-i) | | 10 | 0 | 10 | 0 |
| | | Component (III-x) | | 0 | 0 | 0 | 0 |
| | | Pellets prepared in first stage | | — | 105 | — | 95 |
| | Second raw material feeding inlet | Component (II-i) | Parts by mass | 0 | 0 | 0 | 0 |
| | | Component (II-ii) | | 0 | 0 | 0 | 0 |
| | | Component (II-iii) | | 0 | 0 | 0 | 0 |
| | | Component (V) | | 0 | 7 | 0 | 7 |
| | Liquid addition pump | Component (IV) | Parts by mass | 15 | 0 | 15 | 0 |
| Resin composition physical properties | Partition ratio of component (IV) | $(IV)_{(I)}/(IV)_{(II)}$ | | 269 | | 312 | |
| | Morphology | (1) Co-continuous component (I) phase and component (II) phase | | No | | No | |
| | | (2) Component (II) phase forms matrix | | No | | No | |
| | | (3) Neither of (I) and (2) applies | | Yes | | Yes | |
| | Physical property evaluation results | Smoke generation properties | Generated-smoke density Ds | 449 | | 449 | |
| | | Electrolysis solution-resistance | Tensile strength retention rate (%) | 57 | | 54 | |
| | | Chemical resistance | Salad-oil resistance | Tensile strength retention rate (%) | 0.60 | | 0.54 | |
| | | | Mold cleaning agent-resistance | 1.31 | | 1.25 | |
| | | | Grease-resistance | 0.94 | | 0.89 | |
| | | Flame retardance | Rank | V-1 | | V-1 | |

TABLE 2

| | | | Comparative Example 1 | Comparative Example 2 | Comparative Example 3 | Comparative Example 4 | Comparative Example 5 |
|---|---|---|---|---|---|---|---|
| Resin composition | Component (I) | Parts by mass | 70 | 70 | 70 | 70 | 70 |
| | Component (II) | Parts by mass | 30 | 30 | 30 | 30 | 30 |
| | Component (III) | Parts by mass | 0 | 0 | 0 | 0 | 0 |
| | Component (IV) | Parts by mass | 15 | 7 | 48 | 12 | 12 |
| | Component (V) | Parts by mass | 7 | 7 | 0 | 75 | — |
| | Total amount of vinyl bonding in polymer block of component (III) | % | — | — | — | — | — |
| Production method | | | Production Method 1 | Production Method 1 | Production Method 1 | Production Method 1 | Production Method 1 |
| Resin composition production method | Screw rotation speed | rpm | 300 | 300 | 300 | 300 | 300 |
| | First raw material feeding inlet | Component (I-i) Parts by mass | 70 | 70 | 70 | 70 | 70 |
| | | Component (I-ii) | 0 | 0 | 0 | 0 | 0 |
| | | Component (II-i) | 10 | 30 | 10 | 10 | 70 |
| | | Component (II-ii) | 0 | 0 | 0 | 0 | 10 |
| | | Component (II-iii) | 0 | 0 | 0 | 0 | 0 |
| | | Component (III-i) | 0 | 10 | 0 | 10 | 0 |
| | | Component (III-x) | 0 | 0 | 0 | 0 | 0 |
| | Second raw material feeding inlet | Component (I-i) Parts by mass | 20 | 0 | 20 | 20 | 20 |
| | | Component (II-ii) | 0 | 0 | 0 | 0 | 0 |
| | | Component (II-iii) | 0 | 0 | 0 | 0 | 0 |
| | | Component (V) | 7 | 7 | 0 | 12 | 12 |
| | Liquid addition pump | Component (IV) Parts by mass | 15 | 0 | 48 | 0 | 0 |
| Resin composition physical properties | Partition ratio of component (IV) | $(IV)_{(I)}/(IV)_{(II)}$ | 32.3 | — | 1.38 | — | — |
| | Morphology | (1) Co-continuous component (I) phase and component (II) phase | Yes | No | No | Yes | Yes |
| | | (2) Component (II) phase forms matrix | No | Yes | No | No | No |
| | | (3) Neither of (1) and (2) applies | No | No | Yes | No | No |
| | Physical property evaluation results | Smoke generation properties | Generated smoke density Ds | 439 | 477 | 422 | 1049 | 1362 |
| | | Electrolysis solution-resistance | Tensile strength retention rate (%) | 44 | 46 | 32 | 74 | 68 |

TABLE 2-continued

| | | | Comparative Example 6 | Comparative Example 7 | Comparative Example 8 | Comparative Example 9 | Comparative Example 10 |
|---|---|---|---|---|---|---|---|
| Resin composition | Chemical resistance | Salad-oil resistance Critical strain (%) | 0.36 | 0.37 | 0.32 | 0.65 | 0.55 |
| | | Mold cleaning agent-resistance | 1.08 | 1.07 | 0.63 | 1.59 | 1.38 |
| | | Grease-resistance | 0.66 | 0.66 | 0.39 | 1.05 | 0.94 |
| | Flame retardance | Rank | V-0 | V-1 | HB | V-1 | V-1 |
| | Component (I) | Parts by mass | 70 | 70 | 70 | 70 | 70 |
| | Component (II) | Parts by mass | 30 | 30 | 30 | 30 | 30 |
| | Component (III) | Parts by mass | 10 | 10 | 10 | 0 | 10 |
| | Component (IV) | Parts by mass | 48 | 48 | 15 | 15 | 15 |
| | Component (V) | Parts by mass | 0 | 0 | 7 | 7 | 7 |
| | Total amount of vinyl bonding in polymer block of component (III) | % | 75 | 75 | 75 | — | 75 |
| Production method | | | Production Method 1 | Production Method 1 | Production Method 1 | Production Method 1 | Production Method 3 |
| Resin composition production method | Screw rotation speed | rpm | 300 | 300 | 300 | 300 | 300 |
| | First raw material feeding inlet | Component (I-i) Parts by mass | 70 | 70 | 70 | 70 | 70 |
| | | Component (I-ii) | 0 | 0 | 0 | 0 | 0 |
| | | Component (I-ii) | 0 | 0 | 30 | 0 | 0 |
| | | Component (II-i) | 10 | 0 | 0 | 10 | 10 |
| | | Component (II-ii) | 0 | 10 | 0 | 0 | 0 |
| | | Component (III-i) | 10 | 0 | 0 | 0 | 0 |
| | | Component (III-ii) | 0 | 10 | 10 | 10 | 10 |
| | | Component (III-x) | 0 | 0 | 0 | 0 | 0 |
| | Second raw material feeding inlet | Component (II-i) Parts by mass | 0 | 0 | 0 | 20 | 20 |
| | | Component (II-ii) | 20 | 20 | 0 | 0 | 0 |
| | | Component (II-iii) | 0 | 0 | 0 | 0 | 0 |
| | | Component (V) | 0 | 0 | 7 | 7 | 7 |
| | Liquid addition pump | Component (IV) Parts by mass | 48 | 48 | 15 | 15 | 15 |
| | Partition ratio of component (IV) | $(IV)_{(I)}/(IV)_{(II)}$ | 1.22 | 1.04 | 0.61 | 80 | 9.3 |
| Resin composition physical properties | Morphology | (1) Co-continuous component (I) phase and component (II) phase | No | No | Yes | Yes | Yes |
| | | (2) Component (II) phase forms matrix | No | No | No | No | No |
| | | (3) Neither of (1) and (2) applies | Yes | Yes | No | No | No |

TABLE 2-continued

| | | | Comparative Example 11 | Comparative Example 12 | Comparative Example 13 | Comparative Example 14 | Comparative Example 15 |
|---|---|---|---|---|---|---|---|
| Resin composition | Physical property evaluation results | Smoke generation properties | Generated smoke density Ds | 447 | 504 | 724 | 402 | 397 |
| | | Electrolysis solution-resistance | Tensile strength retention rate (%) | 28 | 26 | 37 | 50 | 60 |
| | | Chemical resistance | Salad-oil resistance Critical strain (%) | 0.21 | 0.15 | 0.37 | 0.40 | 0.51 |
| | | | Mold cleaning agent-resistance | 0.64 | 0.51 | 0.81 | 1.06 | 1.35 |
| | | | Grease-resistance | 0.19 | 0.17 | 0.44 | 0.72 | 0.89 |
| | | Flame retardance | Rank | HB | HB | V-1 | V-0 | V-1 |
| Production method | | | | Production Method 4 | Production Method 3 | Production Method 4 | Production Method 5 | Production Method 7 |
| Resin composition production method | Screw rotation speed | | rpm | 300 | 300 | 300 | 300 | 300 |
| | First raw material feeding inlet | Component (I-i) | Parts by mass | 70 | 70 | 70 | 70 | 70 |
| | | Component (I-ii) | Parts by mass | 30 | 30 | 30 | 30 | 30 |
| | | Component (II-i) | Parts by mass | 0 | 10 | 10 | 10 | 10 |
| | | Component (II-ii) | Parts by mass | 10 | 15 | 15 | 15 | 15 |
| | | Component (II-iii) | Parts by mass | 0 | 7 | 7 | 7 | 7 |
| | | Component (III-i) | Parts by mass | 0 | 75 | 75 | 75 | 75 |
| | | Component (III-x) | Parts by mass | 10 | 0 | 0 | 0 | 0 |
| | Second raw material feeding inlet | Component (II-i) | Parts by mass | 20 | 0 | 0 | 0 | 0 |
| | | Component (II-ii) | | 0 | 0 | 0 | 0 | 0 |
| | | Component (II-iii) | | 0 | 0 | 0 | 0 | 0 |
| | | Component (V) | | 7 | 7 | 7 | 7 | 7 |
| | Liquid addition pump | Component (IV) | Parts by mass | 15 | 15 | 15 | 15 | 15 |

| | | | Comparative Example 11 | Comparative Example 12 | Comparative Example 13 | Comparative Example 14 | Comparative Example 15 |
|---|---|---|---|---|---|---|---|
| Resin composition | Component (I) | | Parts by mass | | | | | |
| | Component (II) | | Parts by mass | | | | | |
| | Component (III) | | Parts by mass | | | | | |
| | Component (IV) | | Parts by mass | | | | | |
| | Component (V) | | Parts by mass | | | | | |
| | Total amount of vinyl bonding in polymer block of component (III) | | % | | | | | |

TABLE 2-continued

| | | | Comparative Example 16 | Comparative Example 17 | Comparative Example 18 | Comparative Example 19 | Comparative Example 20 |
|---|---|---|---|---|---|---|---|
| Resin composition physical properties | Partition ratio of component (IV) | $(IV)_{(I)}/(IV)_{(II)}$ | 6.9 | 8.7 | 5.5 | 9.1 | 4.2 |
| | Morphology | (1) Co-continuous component (I) phase and component (II) phase | Yes | Yes | Yes | Yes | Yes |
| | | (2) Component (II) phase forms matrix | No | No | No | No | No |
| | | (3) Neither of (1) and (2) applies | No | No | No | No | No |
| | Physical property evaluation results | Generated smoke density Ds | 433 | 410 | 418 | 433 | 468 |
| | | Tensile strength retention rate (%) | 49 | 52 | 46 | 53 | 44 |
| | | Electrolysis solution-resistance Critical strain (%) | 0.47 | 0.41 | 0.42 | 0.44 | 0.36 |
| | | Chemical resistance Salad-oil resistance | 1.28 | 1.26 | 1.13 | 1.29 | 1.10 |
| | | Mold cleaning agent-resistance Grease-resistance | 0.86 | 0.85 | 0.79 | 0.88 | 0.74 |
| | Flame retardance | Rank | V-1 | V-1 | V-1 | V-1 | V-1 |

| | | | Comparative Example 16 | Comparative Example 17 | | Comparative Example 18 | | Comparative Example 19 | | Comparative Example 20 | |
|---|---|---|---|---|---|---|---|---|---|---|---|
| | | | First stage Production Method 1 | Second stage Production Method 1 | First stage Production Method 1 | Second stage Production Method 1 | First stage Production Method 1 | Second stage Production Method 1 | First stage Production Method 1 | Second stage Production Method 1 | First stage Production Method 1 | Second stage Production Method 1 |
| Resin composition | Component (I) | Parts by mass | 70 | 70 | 70 | 70 | 70 | 70 | 70 | 70 | 70 |
| | Component (II) | Parts by mass | 0 | 30 | 0 | 30 | 0 | 30 | 0 | 30 | 0 | 30 |
| | Component (III) | Parts by mass | 30 | 0 | 25 | 5 | 5 | 25 | 10 | 10 | 20 | 10 |
| | Component (IV) | Parts by mass | 15 | 0 | 0 | 15 | 0 | 15 | 0 | 15 | 0 | 15 |
| | Component (V) | Parts by mass | 7 | | 0 | 7 | 0 | 7 | 0 | 7 | 0 | 7 |
| | Total amount of vinyl bonding in polymer block of component (III) % | | 75 | 75 | 75 | | 75 | | 75 | | 75 |
| Production method step | | | — | 110 | — | 105 | — | 85 | — | 90 | — | 100 |
| Production method | | Parts by mass | | | | | | | | | | |
| Resin composition production method | First raw material feeding inlet | Component (I-i) | 70 | 0 | 70 | 0 | 70 | 0 | 70 | 0 | 70 | 0 |
| | | Component (I-ii) | 0 | 0 | 0 | 0 | 0 | 0 | 0 | 0 | 0 | 0 |
| | | Component (II-i) | 30 | 0 | 25 | 5 | 5 | 25 | 10 | 20 | 20 | 10 |
| | | Component (II-ii) | 0 | 0 | 0 | 0 | 0 | 0 | 0 | 0 | 0 | 0 |
| | | Component (III-i) | 10 | 0 | 10 | 0 | 10 | 0 | 10 | 0 | 10 | 0 |
| | | Component (III-x) | 0 | 0 | 0 | 0 | 0 | 0 | 0 | 0 | 0 | 0 |
| | | Pellets in prepared in first stage | — | 75 | — | 105 | — | 85 | — | 90 | — | 100 |

TABLE 2-continued

| | | | | | | | | |
|---|---|---|---|---|---|---|---|---|
| | Second raw material feeding inlet | Component (II-i) | Parts by mass | 0 | 0 | 0 | 0 | 0 | 0 |
| | | Component (II-ii) | | 0 | 0 | 0 | 0 | 0 | 0 |
| | | Component (II-iii) | | 0 | 0 | 0 | 0 | 0 | 0 |
| | | Component (V) | | 7 | 7 | 7 | 7 | 7 | 7 |
| | Liquid addition pump | Component (IV) | Parts by mass | 15 | 15 | 15 | 15 | 15 | 15 |
| Resin composition physical properties | Partition ratio of component (IV) | $(IV)_{(I)}/(IV)_{(II)}$ | | 0.49 | 1.3 | 4.6 | 3.0 | 1.7 | |
| | Morphology | (1) Co-continuous component (I) phase and component (II) phase | | Yes | Yes | Yes | Yes | Yes | |
| | | (2) Component (II) phase forms matrix | | No | No | No | No | No | |
| | | (3) Neither of (1) and (2) applies | | No | No | No | No | No | |
| | Physical property evaluation results | Smoke generation properties | Generated smoke density Ds | 768 | 709 | 425 | 492 | 621 | |
| | | Electrolysis solution-resistance | Tensile strength retention rate (%) | 32 | 42 | 38 | 37 | | |
| | | Chemical resistance | Salad-oil resistance Critical strain (%) | 0.33 | 0.34 | 0.35 | 0.31 | 0.32 | |
| | | | Mold cleaning agent-resistance | 0.75 | 0.78 | 1.05 | 0.81 | 0.80 | |
| | | | Grease-resistance | 0.42 | 0.41 | 0.65 | 0.50 | 0.53 | |
| | Flame retardance | | Rank | V-1 | V-1 | V-0 | V-0 | V-1 | |

As shown in Tables 1 and 2, the resin compositions of Examples 1 to 15 had excellent smoke generation properties with low generated-smoke density during burning, and excellent chemical resistance with a high tensile strength retention rate after chemical immersion compared to the resin compositions of Comparative Examples 1 to 20.

INDUSTRIAL APPLICABILITY

According to this disclosure, it is possible to provide a resin composition and a shaped product having excellent smoke generation properties and chemical resistance. A shaped product containing the presently disclosed resin composition can be suitably used for automotive components, interior and exterior components of electrical devices, other components, and so forth.

The invention claimed is:

1. A production method for a resin composition comprising:
    performing melt-kneading of materials comprising:
    a polyphenylene ether resin (I);
    a polypropylene resin (II);
    a hydrogenated block copolymer (III) that is an at least partially hydrogenated product of a block copolymer including a polymer block A, in which the content of a vinyl aromatic compound portion in the polymer block A prior to hydrogenation is more than 50 mass %, and a polymer block B, in which the content of a conjugated diene compound portion of the polymer block B prior to hydrogenation is more than 50 mass % and a total amount of 1,2-vinyl bonding and 3,4-vinyl bonding of the polymer block B prior to hydrogenation is 30% to 90%; and
    a phosphate ester compound (IV), wherein
    relative to 100 parts by mass, in total, of the polyphenylene ether resin (I) and the polypropylene resin (II):
    the polyphenylene ether resin (I) is contained in an amount of 40 parts by mass to 99 parts by mass;
    the polypropylene resin (II) is contained in an amount of 1 part by mass to 60 parts by mass;
    the hydrogenated block copolymer (III) is contained in an amount of 1 part by mass to 20 parts by mass; and
    the phosphate ester compound (IV) is contained in an amount of 5 parts by mass to 45 parts by mass,
    wherein the melt-kneading is performed by an extruder,
    wherein the extruder comprises in the direction of raw material flow, a first raw material feeding inlet located at an upstream side, a first vacuum vent located further downstream than the first raw material feeding inlet, a second raw material feeding inlet located further downstream than the first vacuum vent, a liquid addition pump located further downstream than the second raw material feeding inlet, and a second vacuum vent located further downstream than the liquid addition pump,
    wherein the polypropylene resin (II) is fed into the extruder in a partitioned manner from a plurality of raw material feeding inlets,
    wherein temperature between the first raw material feeding inlet and the second raw material feeding inlet is set to at least 300° C. and not higher than 320° C.,
    wherein at least one orthogonal (N-type) kneading disc element is provided between the liquid addition pump and the second vacuum vent,
    wherein ratio L1/L is 0.2 to 0.75, where L1 is a length from the first raw material feeding inlet to the addition position of the phosphate ester compound, and L is the total barrel effective length.

2. A production method for a resin composition according to claim 1, wherein temperature for the section further downstream than the second raw material feeding inlet is set to at least 270° C. and lower than 300° C.

3. A production method for a resin composition according to claim 1, wherein at least one orthogonal (N-type) kneading disc element and at least one back-conveying (L-type) kneading disc element are provided between the first raw material feeding inlet and the second raw material feeding inlet.

4. A production method for a resin composition according to claim 1, wherein the extruder is a twin screw extruder.

5. A production method for a resin composition according to claim 1, comprising:
    (1-1) melt-kneading all of component (I), some of component (II), and all or some of component (III), to obtain a first kneaded product;
    (1-2) adding any remainder of components (II) and (III) to the first kneaded product obtained in (1-1), and performing further melt-kneading to obtain a second kneaded product; and
    (1-3) adding all of component (IV) to the second kneaded product obtained in (1-2) and performing further melt-kneading.

6. A production method for a resin composition according to claim 1, wherein L/D of the extruder (barrel effective length/barrel internal diameter) is 20 or more.

* * * * *